United States Patent [19]
Hartley

[11] 4,059,036
[45] Nov. 22, 1977

[54] SHEARING HOLLOW STOCK

[75] Inventor: John Edward Hartley, Swavesey, England

[73] Assignee: T.I. (Group Services) Limited, Birmingham, England

[21] Appl. No.: 702,463

[22] Filed: July 6, 1976

[51] Int. Cl.² ............................................. B23D 21/00
[52] U.S. Cl. .................................... 83/188; 269/48.1; 225/103
[58] Field of Search .......................... 269/48.1; 279/2; 228/44.5, 50; 83/54, 188, 198; 225/103

[56] References Cited
U.S. PATENT DOCUMENTS

| | | | |
|---|---|---|---|
| 2,755,093 | 7/1956 | Peter et al. | 279/2 |
| 3,434,709 | 3/1969 | Ramsay | 269/48.1 |
| 3,567,088 | 3/1971 | Anderson | 83/198 |
| 3,742,186 | 6/1973 | Finkel et al. | 269/48.1 |
| 3,811,632 | 5/1974 | Bassett | 279/2 |
| 3,955,453 | 5/1976 | Carmichael et al. | 83/54 |

Primary Examiner—Robert C. Watson
Attorney, Agent, or Firm—Scrivener, Parker, Scrivener & Clarke

[57] ABSTRACT

An internal member for supporting a hollow body during shearing in the form of a close-fitting solid body. The body comprises at least portions meeting in the shearing plane and each portion including at least one split ring having a single gap in its periphery to allow it to expand to fit the hollow body. Expansion may be effected by axial movement of frusto-conical plugs corresponding to and co-operating with frusto-conical inner surface in the rings. Each ring may either comprise a single component, preferably notched on its inner face to increase flexibility, or be in the form of a thin split cylindrical shell surrounding a plurality of inner segments.

4 Claims, 3 Drawing Figures

SHEARING HOLLOW STOCK

This invention relates to an internal shearing member used for supporting a hollow body such as tube stock, during shearing. By the term 'hollow body' we intend to include not only bodies of which the cross-section forms a closed figure but also bodies of channel or C-shaped cross-section which, although not closed, can be treated like tubular bodies as far as their behaviour in shearing is concerned.

In the shearing of flat sheet it is possible to produce a true shearing action between blades which lie on opposite sides of the sheet and also on opposite sides of the shearing plane (which is itself normally perpendicular to the plane of the sheet). However in the shearing of hollow stock such as tubes it is not always possible to support the inside of the tube at all and so the cutting action is not a true shearing action and there is often considerable inward deflection of the wall adjacent to the cut. Attempts have been made to provide an internal shear blade, by putting inside the tube a plug which fills the tube and is split in the shearing plane so that its two parts can move relative to each other in the direction of relative movement of the external shear blades. However this pre-supposes that the tube is of constant internal dimensions, which is not always true, for example in welded tube where there may be a weld bead, and also there is a problem in accurately locating the axial position of the split in the internal member so that it coincides with the shearing plane.

In the specification of U.S. Pat. No. 3,955,453 to Carmichael et al [assigned to the Assignees of the present application] there described an internal support employing an axially compressed elastomeric body, which may be in two parts, spanning the shearing plane. This avoids the need for accurate axial positioning of the support, and also has the advantage of permitting wide tolerances on the diameter and profile of the inside of the tube. However, unless operated at very high pressures it does not give such good support against deflection by the high shearing loads as would a close-fitting solid body.

The aim of the present invention is to provide an internal body which will give close-fitting solid support to a tubular body being sheared, so as to form effectively an internal shear blade, despite variations in the inside diameter of the tube and the possibility of protrusions, such as a weld bead, on its inner wall.

According to the invention we propose that such a support should be in the form of an expanding body comprising at least two parts meeting in the shearing plane and each part including at least one split ring having a single gap in its periphery to allow it to expand to fit the body.

The two parts of the support may each be similar to an expanding mandrel with an associated frusto-conical internal surface co-operating with a correspondingly shaped external surface on a plug which is provided with means for moving it axially. For example the two plugs may be pulled axially together to expand both parts of the support simultaneously, at the same time keeping them in close face to face contact at the shearing plane.

The rings may each be in the form of a single component with the associated frusto-conical internal surface forming its inner face. Alternatively each ring may be of composite form made up of a relatively thin-walled outer shell with cylindrical inner and outer surfaces and a segmented expanding member having a cylindrical outer surface and frusto-conical inner surface. It is also envisaged that even in the case of simple rings with a single gap, each ring may be made up of two or more segments without outer shells provided care is taken that the segments are in contact except at the gap, i.e. that the circumferential spacing is all concentrated in one point, or at least in one region of the circumference. A member according to the invention is preferably used in conjunction with an orbital shearing method described in the specification of co-pending application Ser. No. 566,069 of Carmichael et al now U.S. Pat. No. 4,003,279 in which, after an initial small relative displacement of the two external ring-shaped blades, the shearing action is propogated circumferentially around the stock. However the support could equally well be used in an orthodox eccentric or linear shearing process.

Some embodiments of the invention will now be described, by way of example only, with reference to and as shown in the accompanying drawings, in which.

Figure 1:
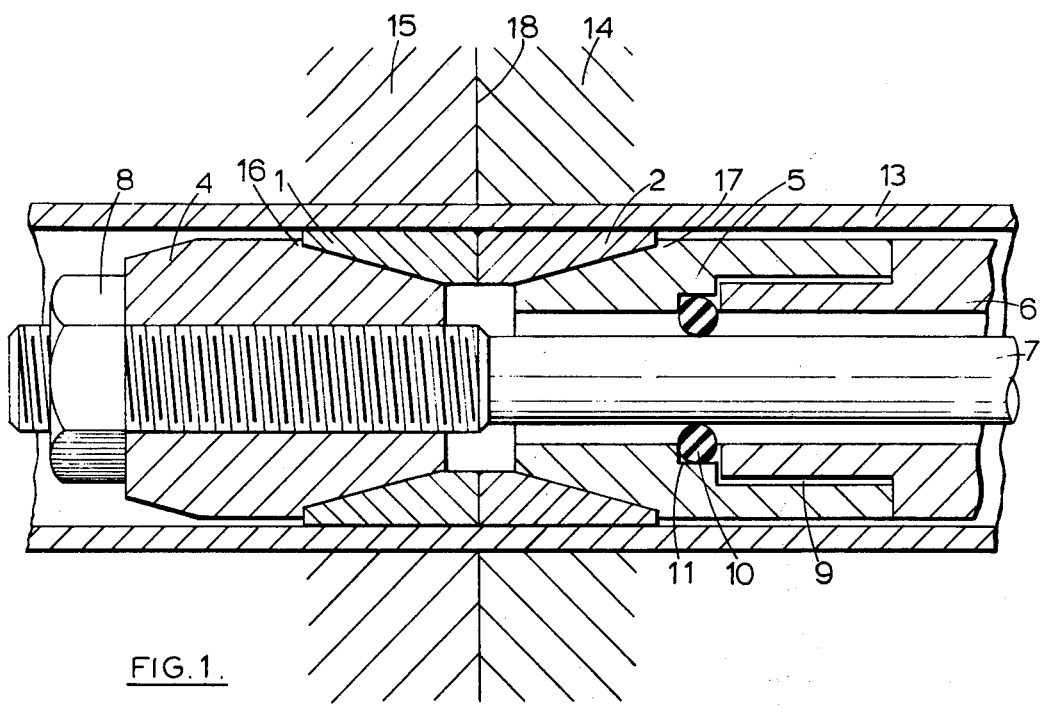
FIG. 1 is an axial section of an internal shearing member embodying the invention.
Figure 2:
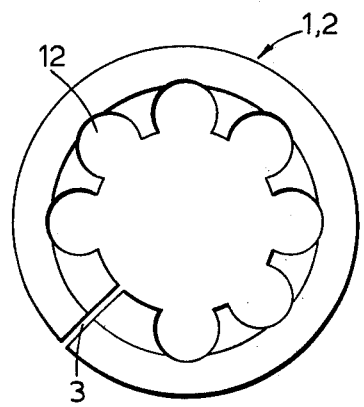
FIG. 2 is a view of a component of the shearing member shown in FIG. 1.

The shearing member shown in FIGS. 1 and 2 comprises two identical split rings 1,2 each having a single gap 3 in its periphery and having a cylindrical outer surface and frusto-conical inner surface. The rings 1,2 are mounted coaxially with each other on a pair of plugs 4,5 which each have outer frusto-conical surface portion corresponding to those in the rings, the smaller ends of the plugs being adjacent to each other. The plugs 4,5 are carried on the end of a mandrel, only an end portion of which is shown in FIG. 1, and which comprises a hollow tube 6 and a rod 7. The rod 7 which is of smaller diameter than the bore of the hollow tube 6 extends beyond the end of the tube. One plug, the outer plug 4 has a threaded bore and is screwed onto the end of the rod 7 which is correspondingly threaded, a lock nut 8 being provided to fix the position of the plug on the rod. The other plug, the inner plug 5 has a bore of the same diameter as the tube through which the rod 7 passes, and a threaded counterbore 9 which screws onto a reduced portion at the end of the tube 6. A resilient ring 10, which may for example be a rubber O-ring, fits over the rod 7 and is located in an internal groove 11 formed between the end of the tube and the bottom of the counterbore in the inner plugs. The ring 10 holds the rod 7 and tube 6 coaxial with each other.

When the projecting end of the rod 7 is drawn back towards the tube 7 the plugs 4,5 are drawn together and the split rings 1,2 forced to expand in the manner of an expanding mandrel. In order that the rings 1,2 are as flexible as possible a number of holes 12 are drilled in each ring parallel to the axis and intersecting the inner surface. Although the rings are not sufficiently flexible to accomodate all surface irregularities they will accomodate variations such as out of roundness or varying wall thickness. There is however a tendency for such coarser irregularities such as a weld bead to be flattened under the high radial force that the rings must necessarily apply to the tube to be effective in resisting distortion of the tube under the high force required for shearing.

As shown in FIG. 1 the member is expanded in a length of tube 13 which is located in aligned dies 14,15 ready for shearing. In this position the split rings 1,2 abut shoulders 16,17 formed between the longer end of the frusto-conical surfaces on the plugs 4,5 and a cylindrical section of outer surface on each plugs. These shoulders act as limit stops and define the maximum expansion of the member. Also by locating the tube 6 accurately the shoulder 17 is accurately located and, the length of the ring 2 being fixed, the plane at which the two rings abut when fully expanded can be accurately set to coincide with the shear plane 18 between the dies 14,15. When the member is relaxed the plane of abutment of the rings moves out of coincidence with the shear plane. (This condition is shown in another embodiment illustrated in FIG. 3).

During a shearing operation the rings 1,2 will move out of alignment with each other. This lack of alignment is accomodated by movement of the rod 7 in the bore of the tube 6, which is of larger diameter than the rod and by elastic deformation of the resilient ring 10. Also during the shearing operation the gap 3 in each split ring 1,2 should be placed on the side of the stock towards which the initial shearing movement is directed, i.e. so that the shearing load on the tube at the region of the gap is outwards rather than inwards. At the same time the gaps in the two rings 1,2 should be circumferentially staggered with respect to each other, so in practice we arrange that they are both offset a limited amount in opposite circumferential directions from the line of action of the shearing movement.

Figure 3:
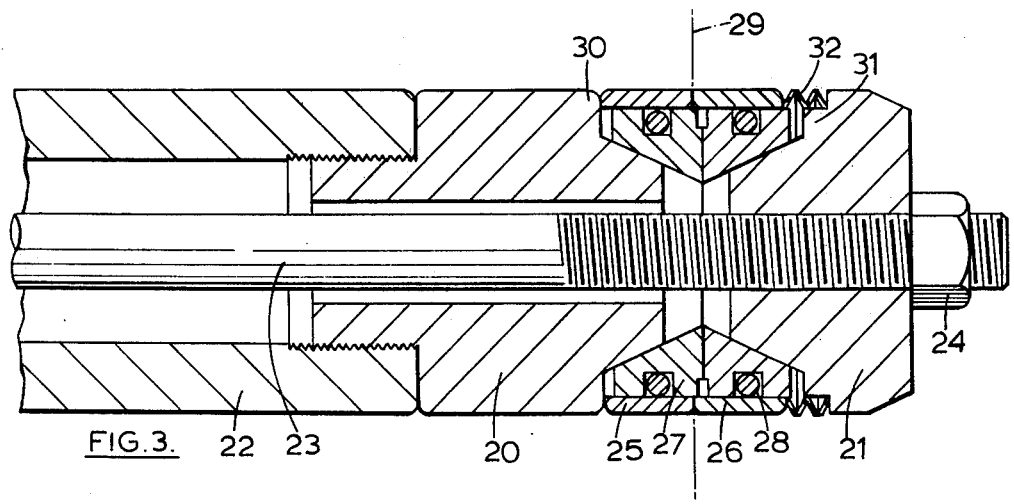
FIG. 3 is an axial section of another form of internal shearing member embodying the invention.

In the members shown in FIG. 3 there is an inner plug 20, an outer plug 21, a hollow tube 22 and central rod 23 with a locknut 24 arranged in a like manner to the equivalent components of FIG. 1. However, the rings are of composite form and each is made up of a relatively thin-walled outer shell 25,26 of uniform inside and outside diameters with a single gap containing a multi-part expanding member comprising four segments 27, each with a cylindrical outer surface and a frusto-conical inner surface for engagement by the associated plug 20,21. The segments 27 are equally spaced around the associated plug 20,21 and held together by a garter spring 28 received in an annular groove in their external surface. The garter spring may be attached to each segment so that it controls their circumferential spacing. Although four segments is found to be a suitable number to use in each ring as few as three or more, for example five or six may be used.

The alignment of the plane of abutment of the two sets of segments 27 with the shear plane 29 and limitation of the degree of expansion is controlled by shoulders 30,31 on the plugs 20,21 in the manner already described in reference to FIG. 1. However the outer shells 25,26 remain in one axial position and during expansion of the member the segments slide axially inside the shells. The axial position of the shells is fixed by abutment of the shell 25 associated with the inner plug 20 against the shoulder 30. The shells are maintained in position by spring loading provided by a stack of conical spring washers 32 between the outer plug 21 and its associated shell 26.

I claim:

1. An assembly for shearing a hollow body comprising a pair of external shear blades, each of said shear blades having an aperture therein to receive said body, said blades meeting in a common shearing plane and being relatively movable in a direction parallel to said plane to shear said body, an internal shearing member lying within said apertures, said member comprising a first expandable portion lying on one side of said plane and a second expandable portion lying on the other side of said plane, said portions being independently movable and each of said portions comprising a circumferentially extending surface having therein only a single gap, and means for expanding said portions simultaneously to substantially fill a hollow body placed in said apertures, said portions being relatively movable in a direction parallel to said plane on relative movement of said external shear blades.

2. The assembly set forth in claim 1 wherein each of said portions comprises an interrupted ring having a single gap and having a conically tapered internal surface converging towards said plane, and wherein said means for expanding said portions comprise a pair of expander plugs having external surfaces co-operating with the internal surfaces of said portions and means for urging said expander plugs together.

3. The assembly set forth in claim 1 wherein each of said portions comprises a multi-part structure, said structure comprising a plurality of segments enclosed in a single circumferentially extending relatively thin-walled flexible shell, said shell having a single gap therein.

4. The assembly set forth in claim 1 wherein each of said portions comprises a single structure, said structure comprising a hollow cylindrical body with a single axially extending gap extending radially through the wall thereof.

* * * * *